United States Patent

Kato et al.

[11] Patent Number: 5,852,701
[45] Date of Patent: Dec. 22, 1998

[54] DISPERSION-SHIFTED FIBER

[75] Inventors: Takatoshi Kato; Yoshiyuki Suetsugu; Masayuki Nishimura, all of Yokohama, Japan

[73] Assignee: Sumitomo Electric Industries, Ltd., Osaka, Japan

[21] Appl. No.: 796,187

[22] Filed: Feb. 7, 1997

[30] Foreign Application Priority Data

Feb. 8, 1996 [JP] Japan .................................. 8-022742

[51] Int. Cl.$^6$ ........................................................ G02B 6/22
[52] U.S. Cl. ........................................................ 385/127
[58] Field of Search ................................... 385/123, 124, 385/125, 126, 127

[56] References Cited

U.S. PATENT DOCUMENTS

| | | | |
|---|---|---|---|
| 4,715,679 | 12/1987 | Bhagavatula | 385/127 |
| 4,755,022 | 7/1988 | Ohashi et al. | |
| 4,822,399 | 4/1989 | Kanamori et al. | |
| 5,327,516 | 7/1994 | Chraplyvy et al. | |
| 5,361,319 | 11/1994 | Antos et al. | 385/123 |

FOREIGN PATENT DOCUMENTS

| | | |
|---|---|---|
| 0 724 171 | 7/1996 | European Pat. Off. . |
| 63-217311 | 9/1988 | Japan . |
| 3-18161 | 3/1991 | Japan . |
| 7-168046 | 7/1995 | Japan . |

OTHER PUBLICATIONS

CCITT/COMXV/RAPP/R089E3.DOC, Draft amended Recommendation G.654 "Characteristics of a 1550nm Wavelength Loss–Minimized Single–Mode Optical Fibre Cable" pp. 116–119.

Electronics Letters 22nd. May 1986 vol.22 No. 11 Relation Between Macrobending Losses and Cutoff Wavelength in Dispersion–shifted Segmented–Core Fibres, pp. 574–575.

Reed et al, "Tailoring Optical Characteristics of Dispersion–Shifted Lightguides For Applications Near 1.55$\mu$m" AT&T Technical Journal, vo. 65, No. 5, Sep.–Oct. 1986, pp. 105–122.

Bhagavatula et al, "Bend–Optimized Dispersion–Shifted Single–Mode Designs", Journal of Lightwave Technology, vol. LT–3, No. 5, Oct. 1985, pp. 954–957.

Nishide et al, "1.55$\mu$m Dispersion Shifted Fibers", Fujikura Technical Reviw 1989, pp. 1–7.

Takahashi et al, "Attenuation and Bending Loss of VAD Dual Shape Core Dispersion–Shifted Fiber", International Wire & Cable Symposium Proceedings 1990, pp. 18–22.

Yamauchi et al, "Design and Performance of Gaussian–Profile Dispersion–Shifted Fibers Manufactured by VAD Process", Journal of Lightwave Technology, vol. 4, No. 8, Aug. 1986, pp. 997–1004.

*Primary Examiner*—Hung N. Ngo
*Attorney, Agent, or Firm*—Pillsbury Madison & Sutro LLP

[57] ABSTRACT

The present invention relates to a dispersion-shifted fiber having a structure which can restrain the bending loss caused by enlargement in mode field diameter from increasing. This dispersion-shifted fiber is a single-mode optical fiber mainly composed of silica glass and has a cutoff wavelength not shorter than the wavelength of signal light at its length of 2 m and a zero-dispersion wavelength within the range of 1.4 $\mu$m to 1.7 $\mu$m. Further, the mode field diameter in this dispersion-shifted fiber is 9.0 $\mu$m or more.

25 Claims, 15 Drawing Sheets

Fig. 9

| | CUTOFF WAVELENGTH AT 2m IN LENGTH (μm) | MFD (μm) | 20mm φ BENDING LOSS (dB/m) | ZERO-DISPERSION WAVELENGTH (nm) |
|---|---|---|---|---|
| Comparative Example | 1.29 | 8.4 | 0.98 | 1580 |
| Embodiment1 | 1.60 | 9.0 | 0.96 | 1581 |
| Embodiment2 | 1.64 | 9.4 | 0.99 | 1579 |
| Embodiment3 | 1.69 | 10.1 | 1.01 | 1582 |

DISPERSION-SHIFTED FIBER

BACKGROUND OF THE INVENTION

1. Field of the Invention

The present invention relates to a dispersion-shifted fiber whose zero-dispersion wavelength is set within the range of 1.4 µm to 1.7 µm.

2. Related Background Art

Conventionally, in optical communication systems adopting a single-mode optical fiber (referred to as "SM optical fiber" hereinafter) as their transmission line, light in the wavelength band of 1.3 µm or 1.55 µm has often been used as signal light for communications. Recently, from the viewpoint of reducing transmission loss in transmission lines, the use of light in the wavelength band of 1.55 µm is increasing. The SM optical fiber applied to such a transmission line for light in the wavelength band of 1.55 µm (referred to as "SM optical fiber for 1.55 µm" hereinafter) is preferably designed such that its wavelength dispersion (phenomenon in which pulse waves expand due to different propagating speeds of light at different wavelengths) is nullified (zero-dispersion wavelength=1.55 µm). Here, there are cases where, in order to suppress the waveform distortion due to a nonlinear optical effect which occurs due to the concentration of transmission light, SM fibers whose zero-dispersion wavelength is slightly shifted from the wavelength value of transmission light are preferable.

In particular, the SM fiber having a structure in which its zero-dispersion wavelength is appropriately set has been known as "dispersion-shifted fiber." Here, "nonlinear optical effect" refers to a phenomenon in which signal light pulse is distorted in proportion to the density of light intensity or the like and has been known to become a factor in limiting the transmission speed.

The cutoff wavelength of a dispersion-shifted fiber is measured at 2 m length thereof in accordance with CCITT-G.650. Generally, the cutoff wavelength of the dispersion-shifted is shorter than that (1.55 µm) of the signal light.

Mainly used as the above-mentioned dispersion-shifted fiber at present is an optical fiber having a refractive index profile of a dual shape core structure disclosed in Japanese Patent Publication No. 3-18161 or a segment core structure disclosed in "Relation between Macrobending Losses and Cutoff Wavelength in Dispersion-Shifted Segmented-Core Fiber," *Electronics Letter*, Vol. 22, No. 11, p. 574, 1986.

Also, such a refractive index profile is obtained when the cladding is substantially comprised of pure silica glass, while the core is comprised of silica glass doped with germanium in order to increase its refractive index.

Japanese Patent Application Laid-Open No. 63-217311 discloses a dispersion-shifted fiber having an inner core, an outer core, and a cladding. Since the outer core and cladding are doped with fluorine (in order to attain a negative refractive index difference with respect to pure silica glass) in this dispersion-shifted fiber, the amount of germanium with which the inner core is doped decreases without changing the refractive index profile of the whole dispersion-shifted fiber, thereby reducing the transmission loss caused by Rayleigh scattering.

Further, in long-distance transmission systems adopting an optical amplifier as a repeater, it has been known that the density in intensity of transmission light in the SM optical fiber installed immediately downstream of the optical amplifier becomes very high. Therefore, the waveform distortion generated under the influence of the nonlinear effect in the SM optical fiber may limit the transmission distance. Accordingly, in order to suppress this phenomenon, a dispersion-shifted fiber having a large mode field diameter (MFD) is desired for reducing the density in intensity of the transmission light even when the whole light intensity of the transmission light is the same. Also, it has conventionally been considered sufficient for an SM optical fiber used for long-distance transmission to have an MFD of about 8.4 µm.

While the bending loss increases as the MFD is greater, it has normally been sufficient, in practice, for a dispersion-shifted fiber bent like an arc with a diameter of 20 mm to have a bending loss not greater than 1 dB/m (measured as being wound around a mandrel having a diameter of 20 mm).

SUMMARY OF THE INVENTION

In general, in long-distance optical transmission systems where the degree of multiplexing is increased by wavelength-multiplexed transmission, since the nonlinear phenomenon is remarkably generated, it is necessary for the mode field diameter (MFD) to be increased. As the MFD becomes larger, however, the bending loss is greater. As a result, transmission loss increases when the dispersion-shifted fiber is applied to a cable created by stranding several fibers, thereby making it difficult to realize practical optical transmission.

An object of the present invention is to provide a dispersion-shifted fiber having a structure which can restrain the bending loss, caused by enlargement of MFD, from increasing.

The dispersion-shifted fiber according to the present invention is a single-mode optical fiber (SM optical fiber) which is mainly composed of silica glass and comprises a core region and a cladding region disposed around the outer periphery of the core region. In particular, the zero-dispersion wavelength of the dispersion-shifted fiber is set within the range of 1.4 µm to 1.7 µm. Also, the cutoff wavelength of the dispersion-shifted fiber at a reference length of 2 m (which may be part of a 2 m length arbitrarily cut out from the dispersion-shifted fiber) is not shorter than the wavelength of signal light propagated through the dispersion-shifted fiber.

Specifically, this dispersion-shifted fiber is assumed to be used as a transmission line for light in the wavelength band of 1.55 µm, thereby making it preferable for the dispersion-shifted fiber to have a cutoff wavelength longer than 1.6 µm at 2 m length thereof. It is due to the fact that the confining effect for the signal light of 1.55-µm wavelength band in the core region in its fundamental mode can be made stronger than that in a dispersion-shifted fiber having a cutoff wavelength not longer than 1.55 µm at 2 m length thereof, and the bending loss can also be reduced.

Here, at a length as short as 2 m, which is used as a reference for general evaluation of cutoff wavelength, the dispersion-shifted fiber propagates not only the fundamental mode but also higher modes of transmission light. In a higher mode, however, the attenuation during propagation through the dispersion-shifted fiber is larger than that in the fundamental mode. Consequently, transmission light of higher modes becomes sufficiently weaker than that of fundamental mode when the propagation length is several kilometers (see FIG. 5). Accordingly, when the propagation distance extends to several hundred or several thousand kilometers as in the case of submarine communication cables, no problems occur due to higher modes.

Next, the MFD of the dispersion-shifted fiber according to the present invention is preferably 9.0 µm or larger. It is due to the fact that such a dispersion-shifted fiber can reduce the density of light intensity, even when the whole light intensity of transmission light is the same, as compared with a conventional dispersion-shifted fiber whose largest MFD is about 8.4 μm, whereby the influence of nonlinear effect can be reduced. Here, even when the MFD is 9.0 μm or more, the cutoff wavelength is set to 1.6 μm or more (not shorter than signal light wavelength) at 2 m length of the dispersion-shifted fiber, whereby the bending loss can be suppressed due to the confining effect for the signal light in its fundamental mode with respect to the core region as mentioned above. Also, when the MFD is 9.0 μm or larger, the dispersion-shifted fiber can sufficiently deal with wavelength division multiplexing (WDM) transmission which is currently in use or expected to be used in future.

Mainly known as a structure for the above-mentioned core region are a dual shape core structure such as that shown in FIG. 2A comprising a first core which has a predetermined refractive index, and a second core which is disposed around the outer periphery of the first core and has a refractive index lower than that of the first core; a segment core structure such as that shown in FIG. 2B comprising a first core which has a predetermined refractive index, a second core which is disposed around the outer periphery of the first core and has a refractive index lower than that of the first core, and a third core which is disposed around the outer periphery of the second core and has a refractive index higher than that of the second core; and a dual ring core structure such as that shown in FIG. 2C comprising a first core which has a predetermined refractive index, a second core which is disposed around the outer periphery of the first core and has a refractive index higher than that of the first core, a third core which is disposed around the outer periphery of the second core and has a refractive index lower than that of the second core, and a fourth core which is disposed around the outer periphery of the third core and has a refractive index higher than that of the third core.

In particular, the cutoff wavelength of the dispersion-shifted fiber can be set to a desired value when a profile volume defined as follows is adjusted.

$$\int_0^a \Delta n(r) \cdot r dr$$

wherein a is the radius of the above-mentioned core region;

r is the distance from the center of the dispersion-shifted fiber in its radial direction from the center toward the outer surface of the dispersion-shifted fiber; and $\Delta n(r)$ is the relative refractive index difference with respect to the cladding at the position apart from the center of the dispersion-shifted fiber at a distance r.

Further, in order to form a depression in a predetermined region of a refractive index profile corresponding to the above-mentioned cladding region (depressed cladding type profile), the dispersion-shifted fiber may comprise an inner cladding (first cladding) having a predetermined refractive index and an outer cladding (second cladding) which is disposed around the outer periphery of the inner cladding and has a refractive index higher than that of the inner cladding.

Here, the inventors have confirmed that the dispersion-shifted fiber having a depressed cladding type profile (referred to as "depressed type fiber" hereinafter) has a shorter cutoff wavelength at a reference length (2 m) thereof as compared with the dispersion-shifted fiber having only the above-mentioned core structure (dispersion-shifted fiber having a matched type profile; referred to as "matched type fiber" hereinafter). It suggests that, even when the profile volume is the same, the cutoff wavelength of the matched type cladding and that of the depressed type fiber deviate from each other according to the value of relative refractive index difference $\Delta n_{dep}$ of the inner cladding with respect to the outer cladding.

Accordingly, when a depressed cladding type profile is adopted as the refractive index profile of the dispersion-shifted fiber, the above-mentioned profile volume is adjusted beforehand. In other words, since the appropriate range for profile volume differs between the matched type fiber and the depressed type fiber, it is necessary for the profile volume to be adjusted beforehand.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 9 is a table showing the cutoff wavelength measured at a length of 2 m (reference length) where the bending loss at a diameter of 20 mm (20-mmφ bending loss) becomes about 1.0 dB/m, MFD, and so forth in each of Embodiments 1 to 3 and the above-mentioned Comparative Example;

DESCRIPTION OF THE PREFERRED EMBODIMENTS

In the following, embodiments of the dispersion-shifted fiber according to the present invention will be explained with reference to FIGS. 1 to 16.

Figure 1:
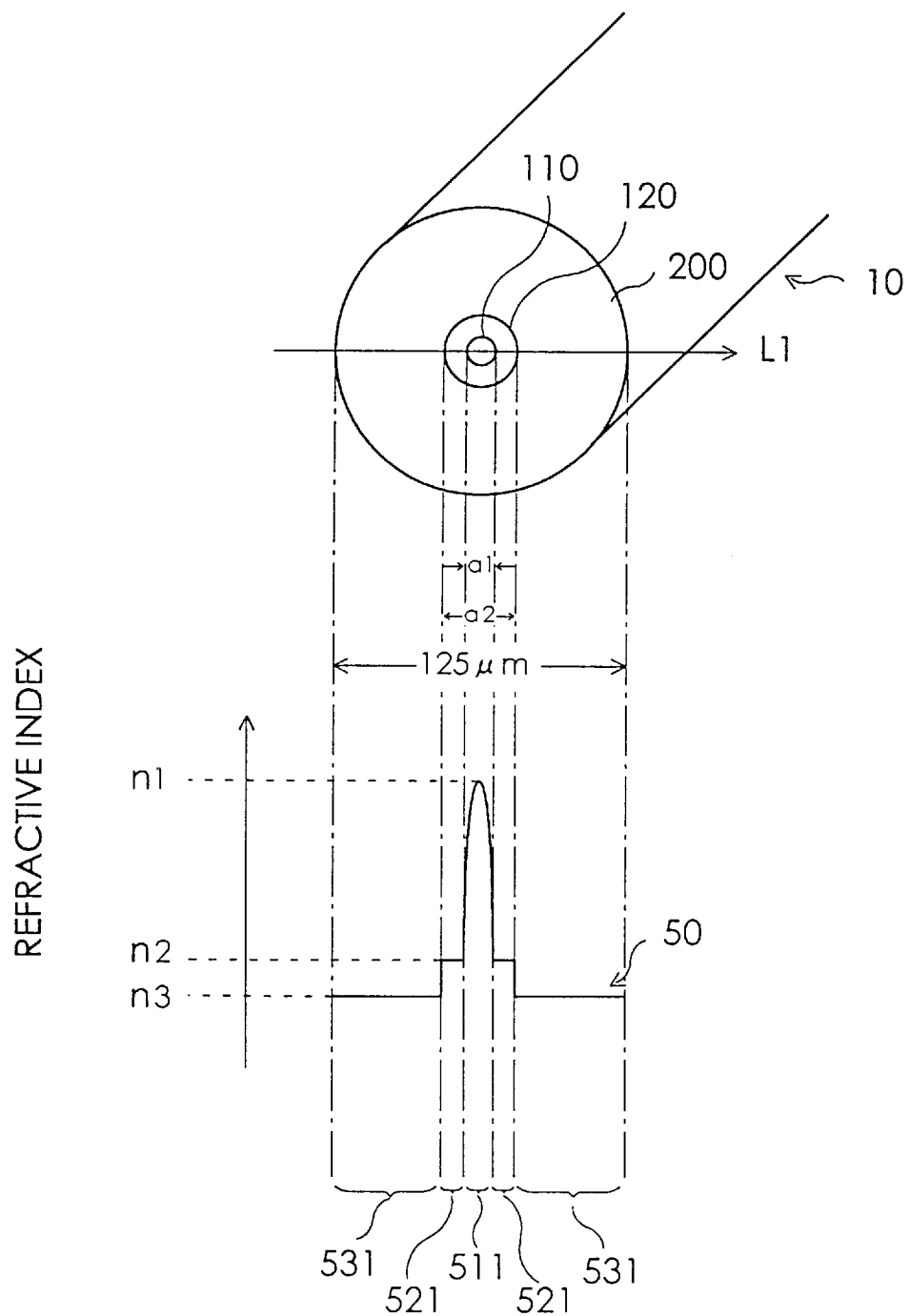
FIG. 1 is a view showing a basic cross-sectional structure of a dispersion-shifted fiber (matched type fiber) according to the present invention and its refractive index profile.

FIG. 1 is a view showing a basic cross-sectional structure of a dispersion-shifted fiber (matched type fiber) according to the present invention and its refractive index profile. As shown in FIG. 1, this dispersion-shifted fiber 10 is a dual shape core type single-mode optical fiber and comprises a first core (inner core) 110 having a refractive index $n_1$ and an outer diameter $a_1$, a second core (outer core) 120 surrounding the first core 110 and having a refractive index $n_2$ ($<n_1$) and an outer diameter $a_2$, and a cladding 200 surrounding the second core 120 and having a refractive index $n_3$ ($<n_2$) and an outer diameter of 125 μm. In this dispersion-shifted fiber, the above-mentioned refractive indices $n_1$, $n_2$, and $n_3$ and outer diameters $a_1$ and $a_2$ are selected such that the cutoff wavelength at a reference length of 2 m becomes at least 1.6 μm and that the mode field diameter (MFD) becomes at least 9.0 μm.

Here, the axis of abscissa of a refractive index profile 50 shown in FIG. 1 corresponds to positions on line L1 in the cross section of the dispersion-shifted fiber 10 (plane perpendicular to the advancing direction of signal light propagated therethrough). Further, in this refractive index profile 50, regions 511, 521, and 531 respectively correspond to the refractive index ($n_1$) on the line L1 of parts in the inner core 110, the refractive index ($n_2$) on the line L1 of parts in the outer core 120, and the refractive index ($n_3$) on the line L1 of parts in the cladding 200.

In this specification, relative refractive index difference $\Delta$ is defined as follows:

$$\Delta = (n_t^2 - n_c^2)/2n_c^2 \qquad (1)$$

wherein $n_c$ is the refractive index of a glass region (e.g., pure silica glass or cladding) which provides a reference, and $n_t$ is the refractive index of each glass region. Accordingly, for example, relative refractive index difference $\Delta n_1$ of the inner core 110 having the refractive index $n_1$ with respect to pure silica glass having the refractive index $n_c$ is given by $(n_1^2 - n_c^2)/2n_c^2$. Also, the refractive indices in the above expression can be arranged in either order. Consequently, a glass region where the relative refractive index difference with respect to the reference glass region (e.g., pure silica glass) is a negative value indicates that it is a glass region having a refractive index lower than the refractive index $n_c$ of the reference glass region.

In the dispersion-shifted fiber 10 of FIG. 1, since its cutoff wavelength at a 2 m reference thereof is at least 1.6 μm, signal light can be transmitted in a state where the confining effect for the fundamental mode of signal light in the wavelength band of 1.55 μm is greater than that in a dispersion-shifted fiber having a cutoff wavelength of 1.55 μm or shorter. Then, it becomes possible for the bending loss at a diameter of 20 mm (20-mmϕ bending loss) to be suppressed to about 1 dB/m.

Figure 2A:
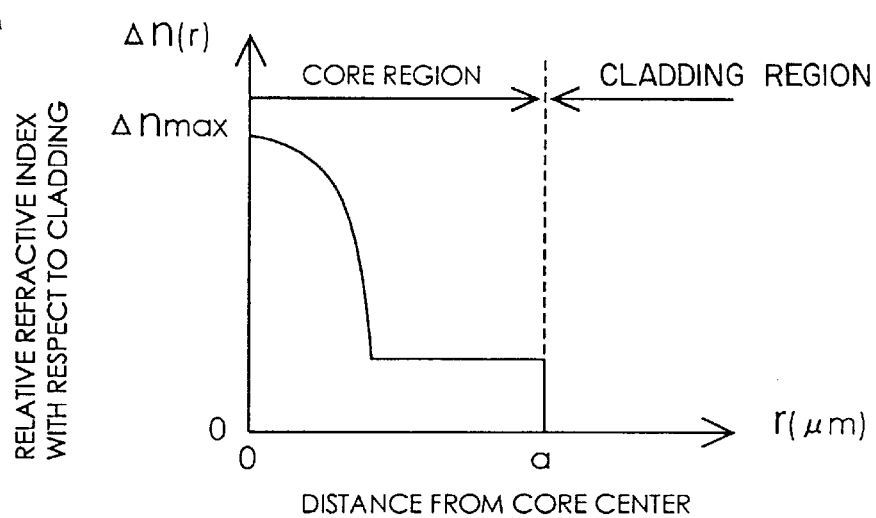
FIGS. 2A to 2C are views showing structures of the core region of the dispersion-shifted fiber according to the present invention, respectively representing dual shape core structure, segment core structure, and dual ring structure.
Figure 2B:
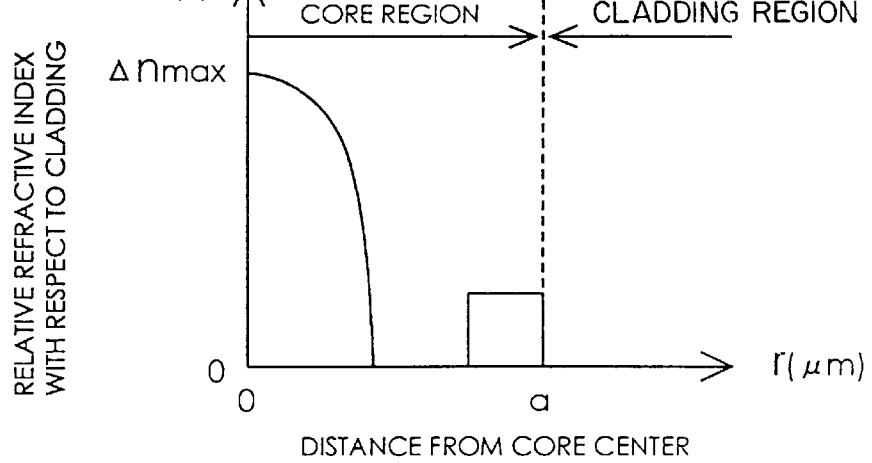
Figure 2C:
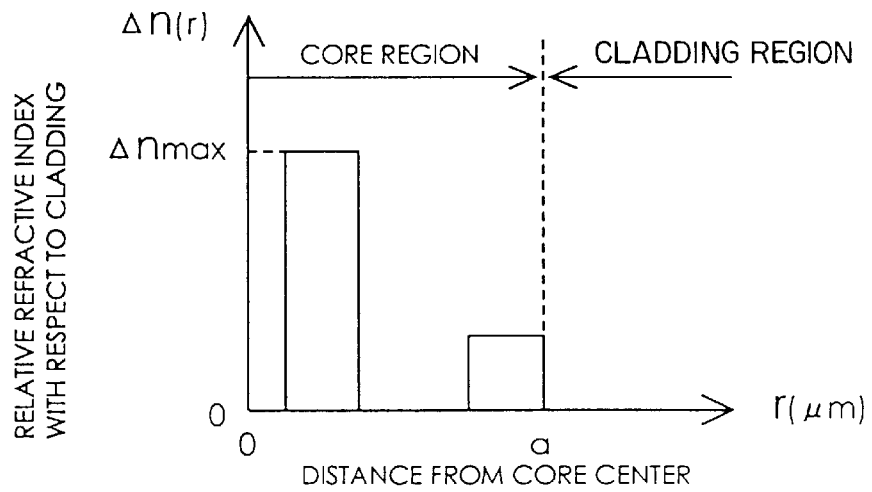

Known as a core structure for the dispersion-shifted fiber according to the present invention, for example, are dual shape structure, segment core structure, and dual ring core structure which are shown in FIGS. 2A to 2C, respectively.

Namely, the dual shape core structure comprises a first core (inner core) having a predetermined refractive index, and a second core (outer core) disposed around the outer periphery of the first core and having a refractive index lower than that of the first core. The segment core structure comprises a first core (inner core) having a predetermined refractive index; a second core (intermediate core) disposed around the outer periphery of the first core and having a refractive index lower than that of the first core; and a third core (outer core) disposed around the outer periphery of the second core and having a refractive index higher than that of the second core. The dual ring core structure comprises a first core having a predetermined refractive index; a second core disposed around the outer periphery of the first core and having a refractive index higher than that of the first core; a third core disposed around the outer periphery of the second core and having a refractive index lower than that of the second core; and a fourth core disposed around the outer periphery of the third core and having a refractive index higher than that of the third core.

In particular, the profile volume of the dispersion-shifted fiber is defined as follows:

$$\int_0^a \Delta n(r) \cdot r dr$$

wherein
a is the radius of the above-mentioned core region;
r is the distance from the center of the dispersion-shifted fiber, which substantially corresponds to the center of the core region, in its radial direction; and
$\Delta n(r)$ is the relative refractive index difference with respect to the cladding at the position apart form the center of the dispersion-shifted fiber at the distance r. Here, in the case of a depressed type fiber (see FIG. 13), $\Delta n(r)$ indicates the relative refractive index difference of a predetermined part in the core region with respect to the inner cladding (first cladding).

Figure 3:
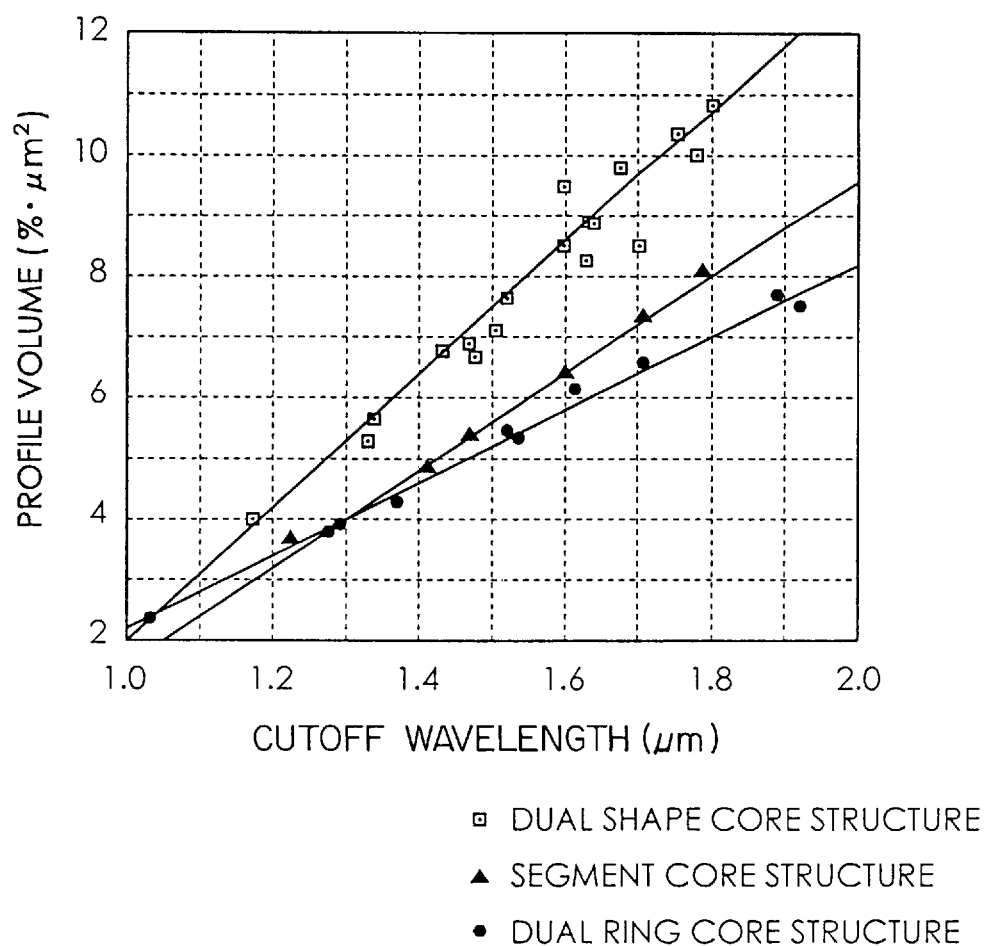
FIG. 3 is a graph showing the relationship between profile volume and cutoff wavelength at a reference length of 2 m.

In each of the above-mentioned core structures, its profile volume and cutoff wavelength have a relationship shown in FIG. 3. Accordingly, the cutoff wavelength of the dispersion-shifted fiber can be set to a desired value when the above-mentioned profile volume is adjusted.

Here, the inventors have studied conditions for attaining a cutoff wavelength of at least 1.6 μm in each core structure at a reference length of 2 m and have obtained the following values.

Dual shape structure:

$$0.6(\%) \leq \Delta n_{max} \leq 1.4(\%)$$

$$\int_0^a \Delta n(r) \cdot r \, dr \geq 8.4(\% \cdot \mu m^2)$$

Segment core structure:

$$\int_0^a \Delta n(r) \cdot r \, dr \geq 6.4(\% \cdot \mu m^2)$$

$$0.6(\%) \leq \Delta n_{max} \leq 1.4(\%)$$

Dual ring core structure:

$$\int_0^a \Delta n(r) \cdot r \, dr \geq 5.8(\% \cdot \mu m^2)$$

$$0.7(\%) \leq \Delta n_{max} \leq 2.0(\%)$$

Figure 14A:
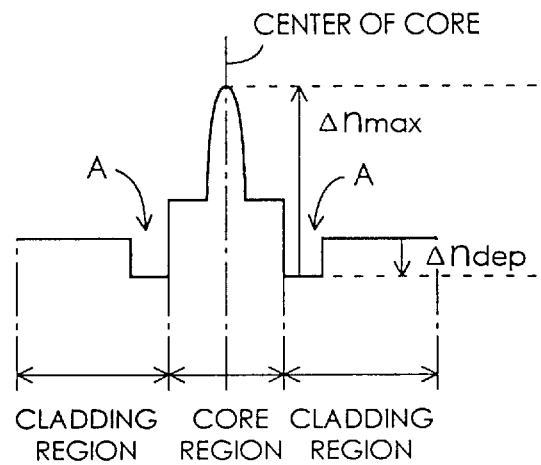
FIGS. 14A to 14C are views showing specific depressed cladding type profiles, representing those having a dual shape core structure, a segment core structure, and a dual ring core structure, respectively.
Figure 14B:
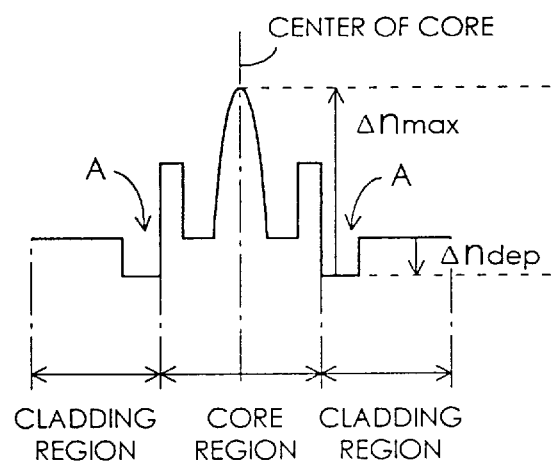
Figure 14C:
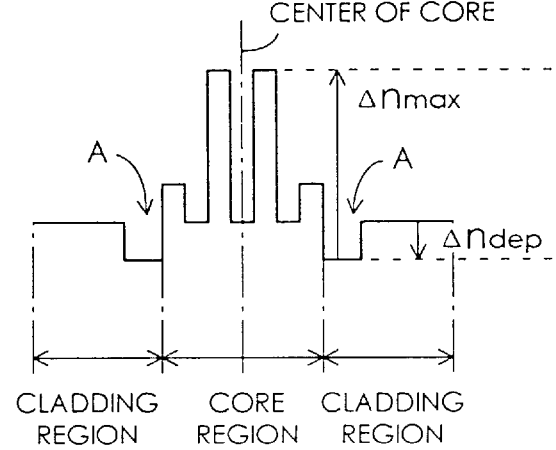

Here, $\Delta n_{max}$ refers to the maximum relative refractive index difference in the core region with respect to the cladding in the matched type fiber, and the maximum relative refractive index difference in the core region with respect to the inner cladding (first cladding) in the depressed type fiber (see FIGS. 14A to 14C).

In the following, each embodiment of the dispersion-shifted fiber according to the present invention will be explained.

(Embodiment 1)

Figure 4:
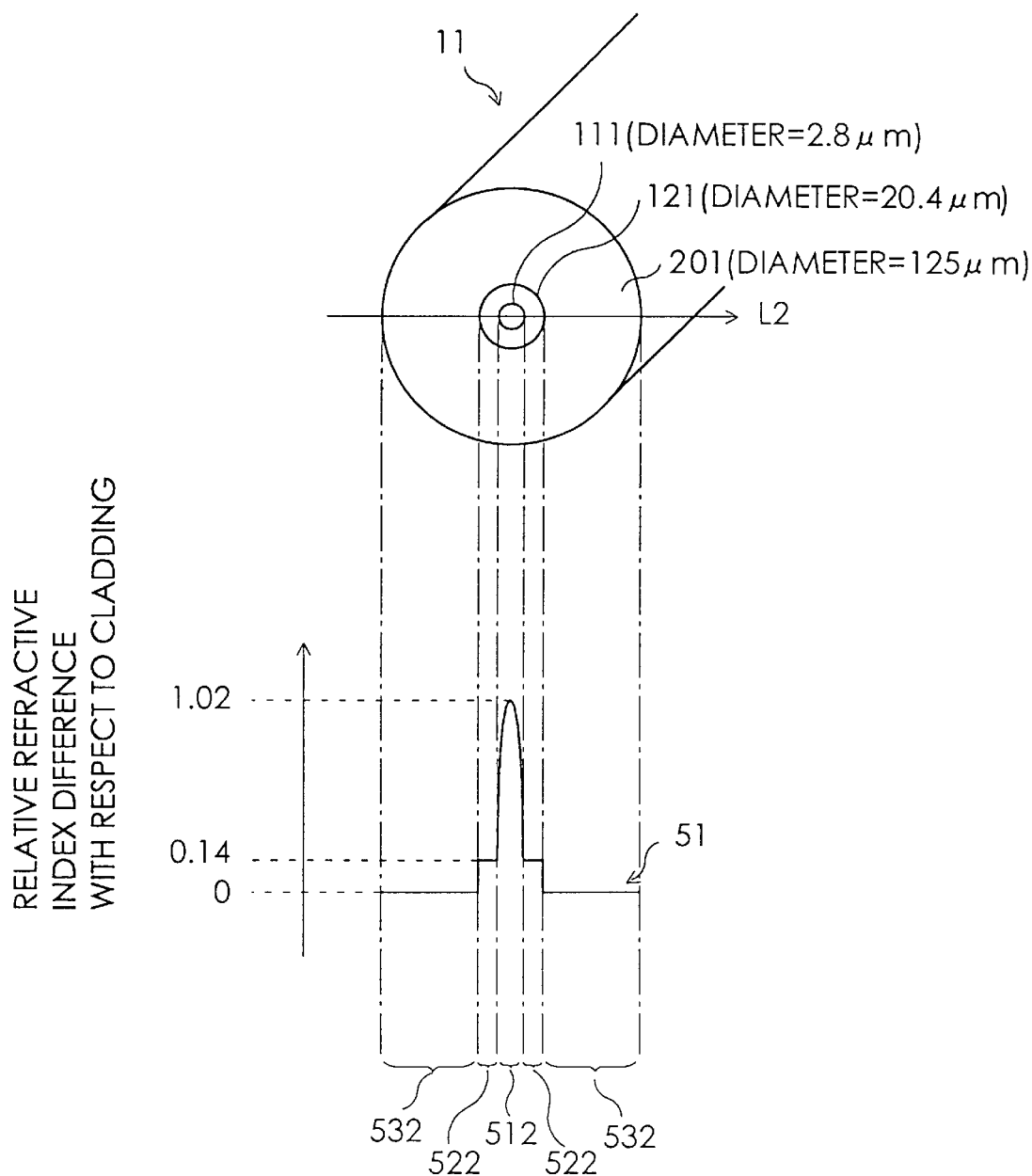
FIG. 4 is a view showing the cross-sectional structure of Embodiment 1 of the dispersion-shifted fiber according to the present invention and the refractive index profile thereof.
Figure 5:
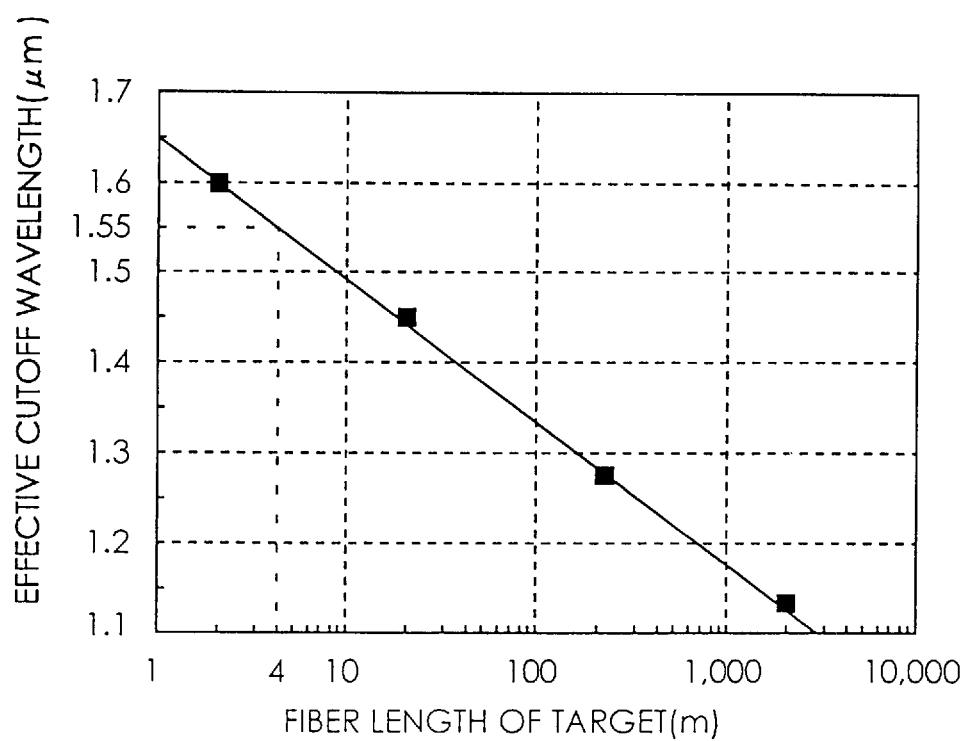
FIG. 5 is a graph showing the relationship of the length and cutoff wavelength in the dispersion-shifted fiber shown in FIG. 4.

FIG. 4 is a view showing the cross-sectional structure of Embodiment 1 of the dispersion-shifted fiber according to the present invention and the refractive index profile thereof.

As shown in FIG. 4, this dispersion-shifted fiber 11 comprises a first core (inner core) 111 having a relative refractive index difference of 1.02% ($\Delta n_{max}$) with respect to a cladding 201 and an outer diameter of 2.8 μm; a second core (outer core) 121 surrounding the first core 111 and having a relative refractive index difference of 0.14% ($\Delta n_{max}$) with respect to the cladding 201 and an outer diameter of 20.4 μm; and the cladding 201 surrounding the second core 121 and having an outer diameter of 125 μm. Here, the axis of abscissa of a refractive index profile 51 shown in FIG. 4 corresponds to positions on line L2 in the cross section of the dispersion-shifted fiber 11 (plane perpendicular to the advancing direction of signal light propagated therethrough). Further, in this refractive index profile 51, regions 512, 522, and 532 respectively correspond to the relative refractive index differences on the line L2 of parts in the first core 111, second core 121, and cladding 201.

In the dispersion-shifted fiber 11 is designed as described above, the zero-dispersion wavelength is 1,581 nm, the cutoff wavelength at a length of 2 m is 1.60 μm, and the MFD is 9.0 μm. Also, the 20-mmφ bending loss in Embodiment 1 is 0.98 dB/m with respect to light in the wavelength band of 1.55 μm.

Here, in the dispersion-shifted fiber 11 of Embodiment 1, though it does not satisfy a single-mode condition with respect to signal light in the wavelength band of 1.55 μm since its cutoff wavelength at a 2 m reference length of the dispersion-shifted fiber (Embodiment 2) is at least 1.6 μm, it can function as a single-mode optical fiber with respect to signal light in the wavelength band of 1.55 μm when its length is at least 4 m (i.e., there is no problem when it is applied to long-distance transmission).

(Embodiment 2)

Figure 6:
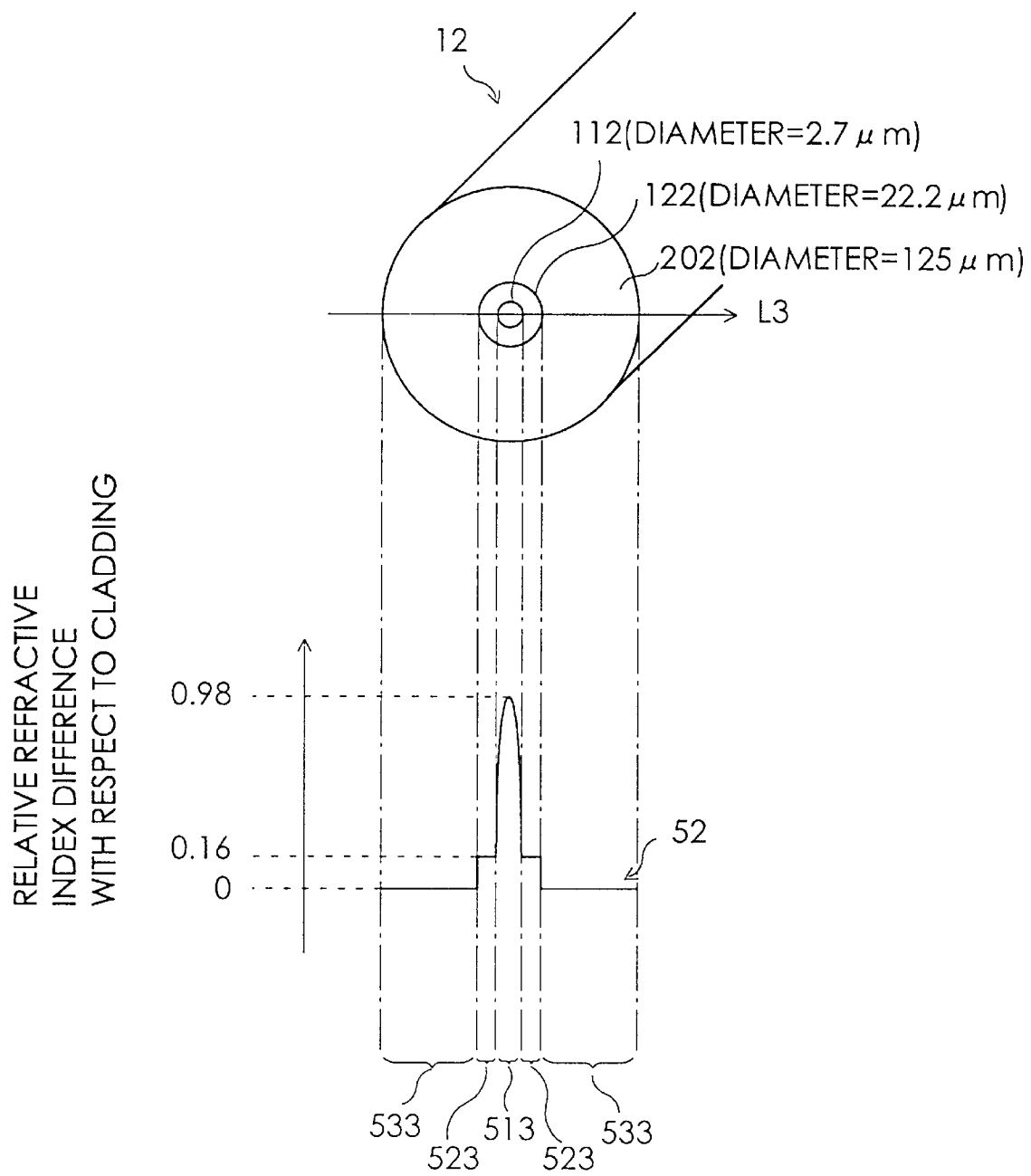
FIG. 6 is a view showing the cross-sectional structure of Embodiment 2 of the dispersion-shifted fiber according to the present invention and the refractive index profile thereof.

FIG. 6 is a view showing the cross-sectional structure of Embodiment 2 of the dispersion-shifted fiber according to the present invention and the refractive index profile thereof.

As shown in FIG. 6, this dispersion-shifted fiber 12 comprises a first core (inner core) 112 having a relative refractive index difference of 0.98% ($\Delta n_{max}$) with respect to a cladding 202 and an outer diameter of 2.7 μm; a second core (outer core) 122 surrounding the first core 112 and having a relative refractive index difference of 0.16% ($\Delta n_{max}$) with respect to the cladding 202 and an outer diameter of 22.2 μm; and the cladding 202 surrounding the second core 122 and having an outer diameter of 125 μm. Here, the axis of abscissa of a refractive index profile 52 shown in FIG. 6 corresponds to positions on line L3 in the cross section of the dispersion-shifted fiber 12 (plane perpendicular to the advancing direction of signal light propagated therethrough). Further, in this refractive index profile 52, regions 513, 523, and 533 respectively correspond to the relative refractive index differences on the line L3 of parts in the first core 112, second core 122, and cladding 202.

In the dispersion-shifted fiber 12 is designed as described above, the zero-dispersion wavelength is 1,579 nm, the cutoff wavelength at a length of 2 m is 1.64 μm, and the MFD is 9.4 μm. Also, the 20-mmφ bending loss in Embodiment 2 is 0.99 dB/m with respect to light in the wavelength band of 1.55 μm.

(Embodiment 3)

Figure 7:
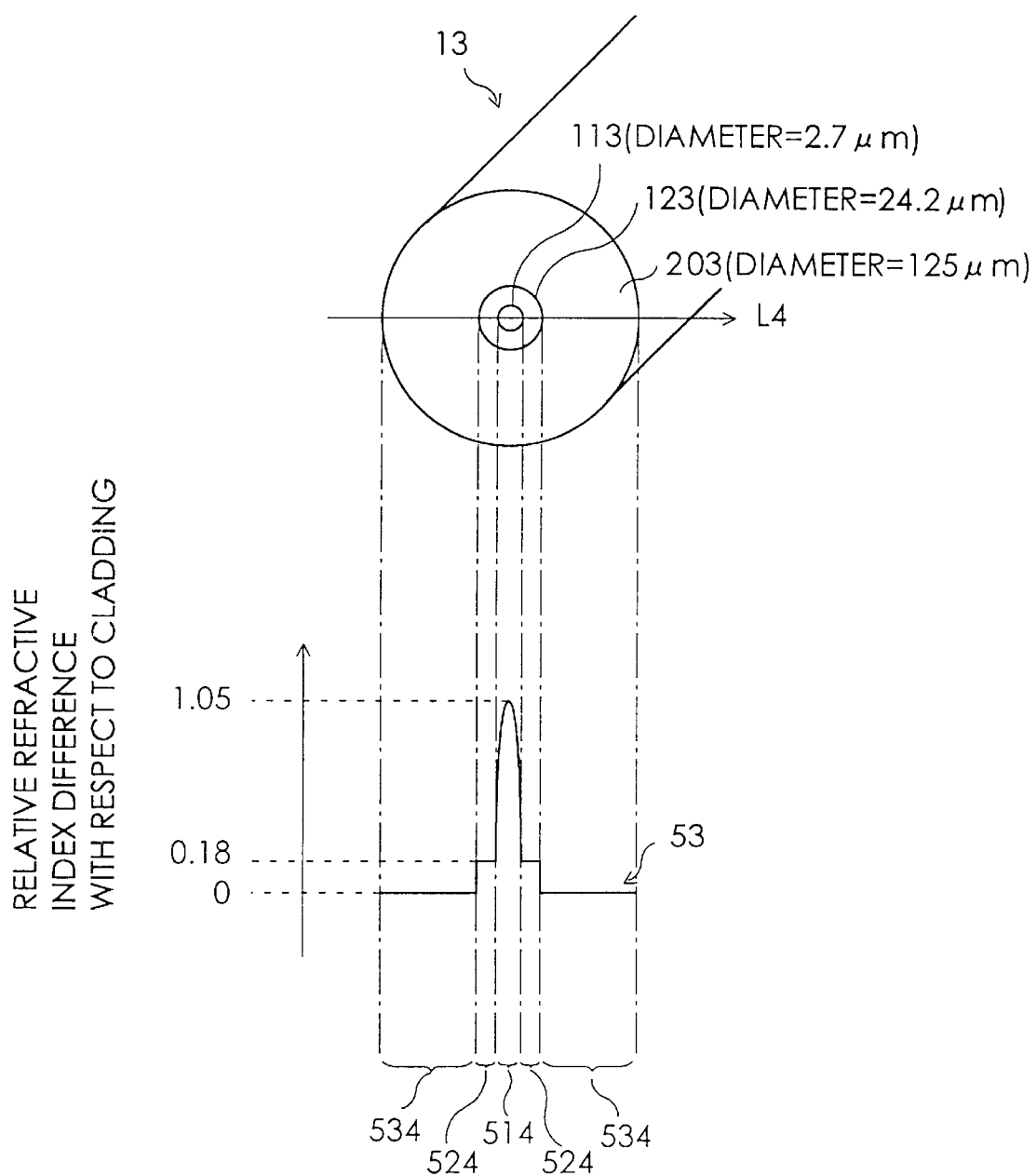
FIG. 7 is a view showing the cross-sectional structure of Embodiment 3 of the dispersion-shifted fiber according to the present invention and the refractive index profile thereof.

FIG. 7 is a view showing the cross-sectional structure of Embodiment 3 of the dispersion-shifted fiber according to the present invention and the refractive index profile thereof.

As shown in FIG. 7, this dispersion-shifted fiber 13 comprises a first core (inner core) 113 having a relative refractive index difference of 1.05% ($\Delta n_{max}$) with respect to a cladding 203 and an outer diameter of 2.7 μm; a second core (outer core) 123 surrounding the first core 113 and having a relative refractive index difference of 0.18% ($\Delta n_{max}$) with respect to the cladding 203 and an outer diameter of 24.4 μm; and the cladding 203 surrounding the second core 123 and having an outer diameter of 125 μm. Here, the axis of abscissa of a refractive index profile 53 shown in FIG. 7 corresponds to positions on line L4 in the cross section of the dispersion-shifted fiber 13 (plane perpendicular to the advancing direction of signal light propagated therethrough). Further, in this refractive index profile 53, regions 514, 524, and 534 respectively correspond to the relative refractive index differences on the line L4 of parts in the first core 113, second core 123, and cladding 203.

In the dispersion-shifted fiber 13 is designed as described above, the zero-dispersion wavelength is 1,582 nm, the cutoff wavelength at a length of 2 m is 1.69 μm, and the MFD is 10.1 μm. Also, the 20-mm diameter bending loss in Embodiment 3 is 1.01 dB/m with respect to light in the wavelength band of 1.55 μm.

(Comparative Example)

Figure 8:
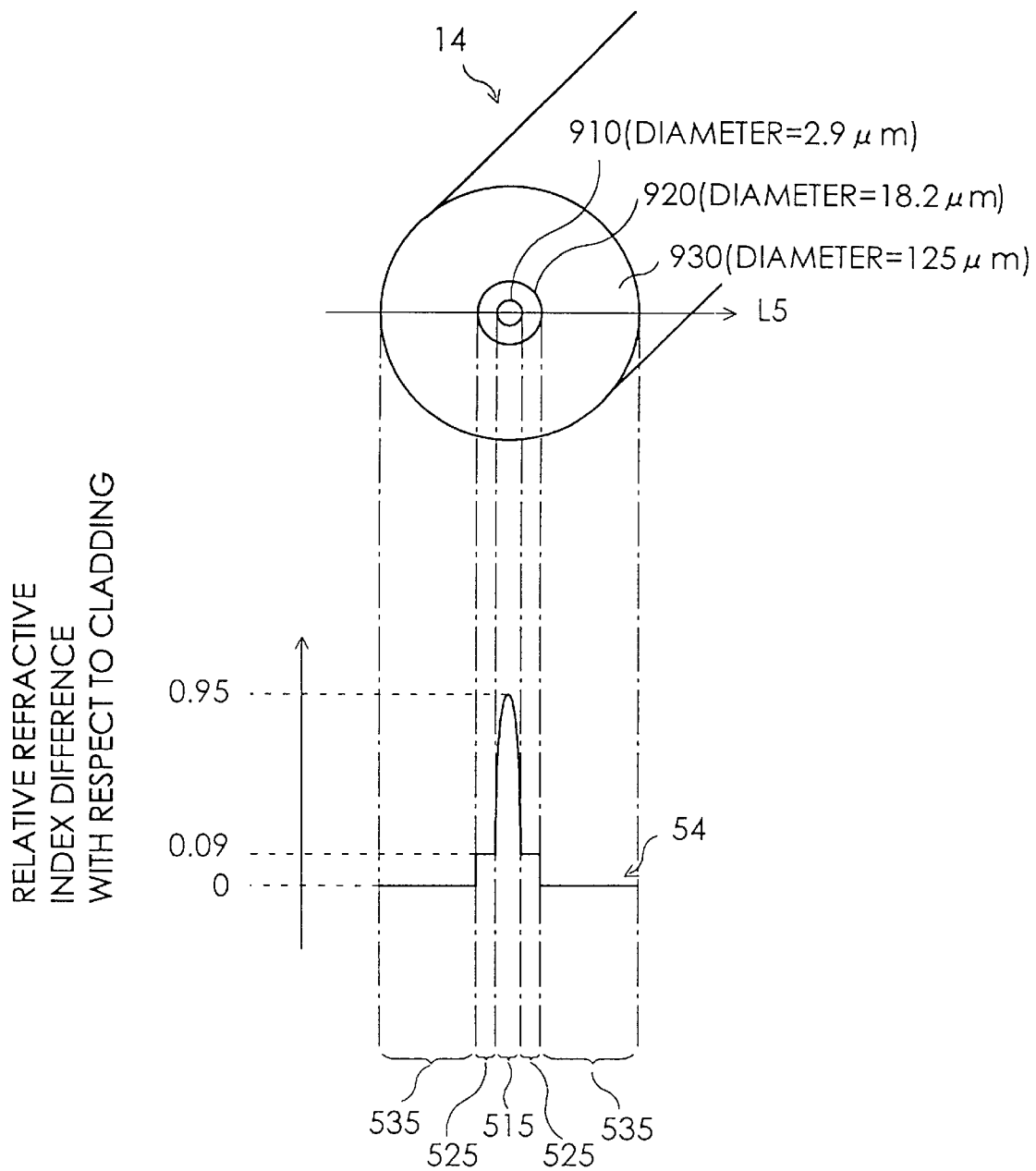
FIG. 8 is a view showing the cross-sectional structure of a Comparative Example (dispersion-shifted fiber) and the refractive index profile thereof.

FIG. 8 is a view showing the cross-sectional structure of a typical conventional dispersion-shifted fiber which is prepared as Comparative Example and the refractive index profile thereof.

As shown in FIG. 8, this dispersion-shifted fiber 14 comprises a first core (inner core) 910 which is a glass region mainly composed of silica glass containing germanium (Ge), having a relative refractive index difference of 0.95% with respect to pure silica glass and an outer diameter of 2.9 μm; a second core (outer core) 920 which is a glass region containing Ge, surrounding the first core 910, and having a relative refractive index difference of 0.09% with respect to pure silica glass and an outer diameter of 18.2 μm; and a cladding 930 substantially made of pure silica glass, surrounding the second core 920 and having an outer diameter of 125 μm. Here, the axis of abscissa of a refractive index profile 54 shown in FIG. 8 corresponds to positions on line L5 in the cross section of the dispersion-shifted fiber 14 (plane perpendicular to the advancing direction of signal light propagated therethrough). Further, in this refractive index profile 54, regions 515, 525, and 535 respectively correspond to the relative refractive index differences on the line L5 of parts in the first core 910, second core 920, and cladding 930.

In the dispersion-shifted fiber 14 is designed as described above, the zero-dispersion wavelength is about 1,580 nm, the cutoff wavelength at a length of 2 m is about 1.29 μm, and the MFD is about 8.4 μm. Also, the 20-mmφ bending loss in this Comparative Example is 0.98 dB/m with respect to light in the wavelength band of 1.55 μm.

The table shown in FIG. 9 indicates the cutoff wavelength at a length of 2 m (reference length) where the 20-mmφ bending loss becomes about 1.0 dB/m, MFD, and so forth in each of Embodiments 1 to 3 and the above-mentioned Comparative Example.

Figure 10:
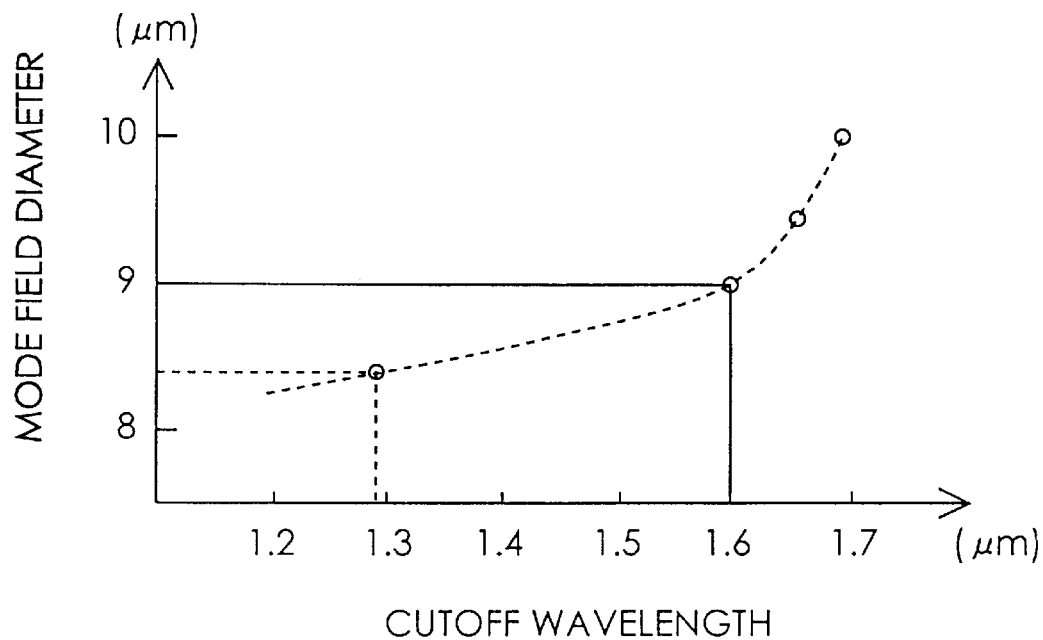
FIG. 10 is a graph, based on the table of FIG. 9, showing the relationship between the cutoff wavelength at a length of 2 m where the 20-mmφ bending loss becomes about 1.0 dB/m and MFD.

Further, FIG. 10 is a graph, based on the table of FIG. 9, showing the relationship between the cutoff wavelength at a length of 2 m where the 20-mmφ bending loss becomes about 1.0 dB/m and the MFD. From FIG. 10, it can be seen that, in the case where the zero-dispersion wavelength is about 1,580 nm, when the cutoff wavelength at a length of 2 m is at least 1.6 μm, the 20-mmφ bending loss can be suppressed to about 1.0 dB/m even when the MFD is 9.0 μm or larger.

On the other hand, the inventors have also studied cabling of the dispersion-shifted fiber 14 (Comparative Example) having the structure shown in FIG. 8. Here, its MFD is set to about 9.0 μm, while the zero-dispersion wavelength and cutoff wavelength at a reference length of 2 m are respectively kept at about 1,580 nm and not longer than 1.55 μm. As a result, it has been confirmed that (a) the 20-mmφ bending loss with respect to signal light in the wavelength band of 1.55 μm becomes at least 10 dB/m when the cutoff wavelength at a reference length of 2 m is set to about 1.3 μm, and (b) the 20-mmφ bending loss with respect to signal light in the wavelength band of 1.55 μm becomes at least 4 dB/m when the cutoff wavelength at a reference length of 2 m is set to about 1.55 μm, thereby each greatly exceeding the practical upper limit of 1 dB/m.

Figure 11:
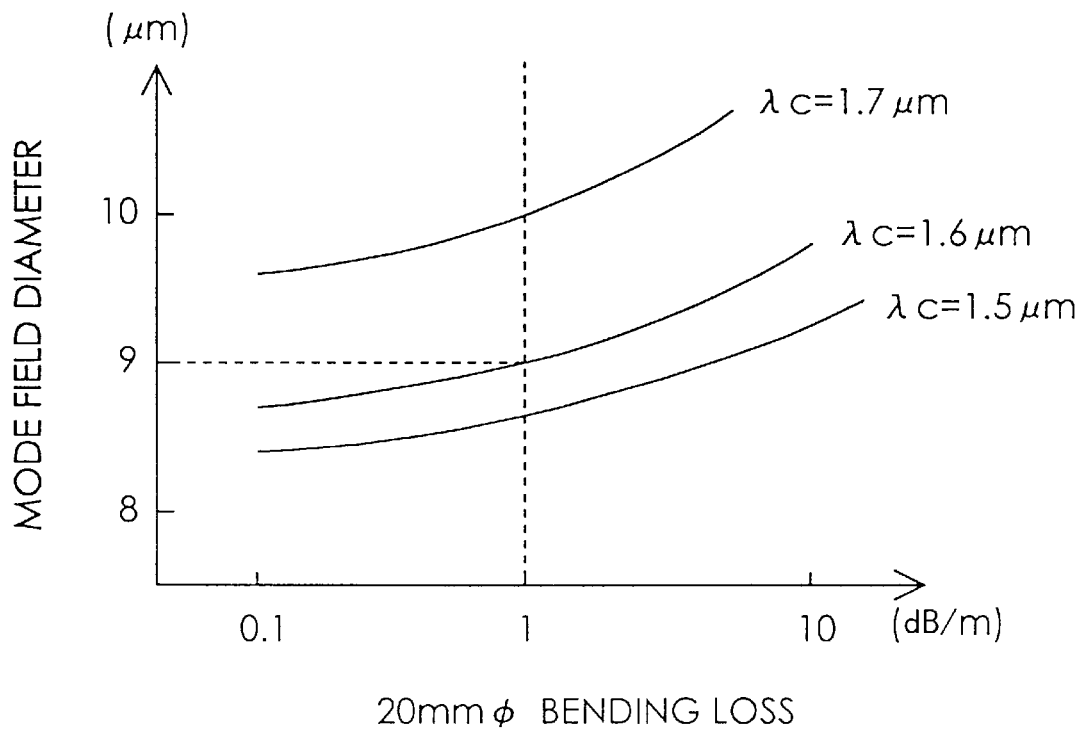
FIG. 11 is a graph showing the relationship between the 20-mmφ bending loss and MFD at each level of cutoff wavelength ($\lambda_c$)=1.5 μm, 1.6 μm, and 1.7 μm at a 2 m reference length of the dispersion-shifted fiber.

FIG. 11 is a graph showing the relationship between the 20-mmφ bending loss and MFD at each level of cutoff wavelength ($\lambda_c$)=1.5 μm, 1.6 μm, and 1.7 μm at a reference length of 2 m. From this graph, it can be seen that, when the MFD is large, the 20-mmφ bending loss cannot be reduced unless the cutoff wavelength is increased. It can also be seen that increase in the cutoff wavelength is advantageous from the viewpoint of suppressing the influence caused by non-linear effects, since it can make the MFD larger even when the 20-mmφ bending loss is the same.

Without being restricted to the foregoing embodiments, the present invention can be modified in various manners. For example, the inventors have confirmed that the present invention yields similar effects when the dispersion-shifted fiber has a rectangular or triangular refractive index profile (of dual shape core structure) in place of a bullet-shaped refractive index profile (of dual shape core structure) of the first core (inner core having the maximum relative refractive index difference $\Delta n_{max}$ with respect to the cladding).

Figure 12:
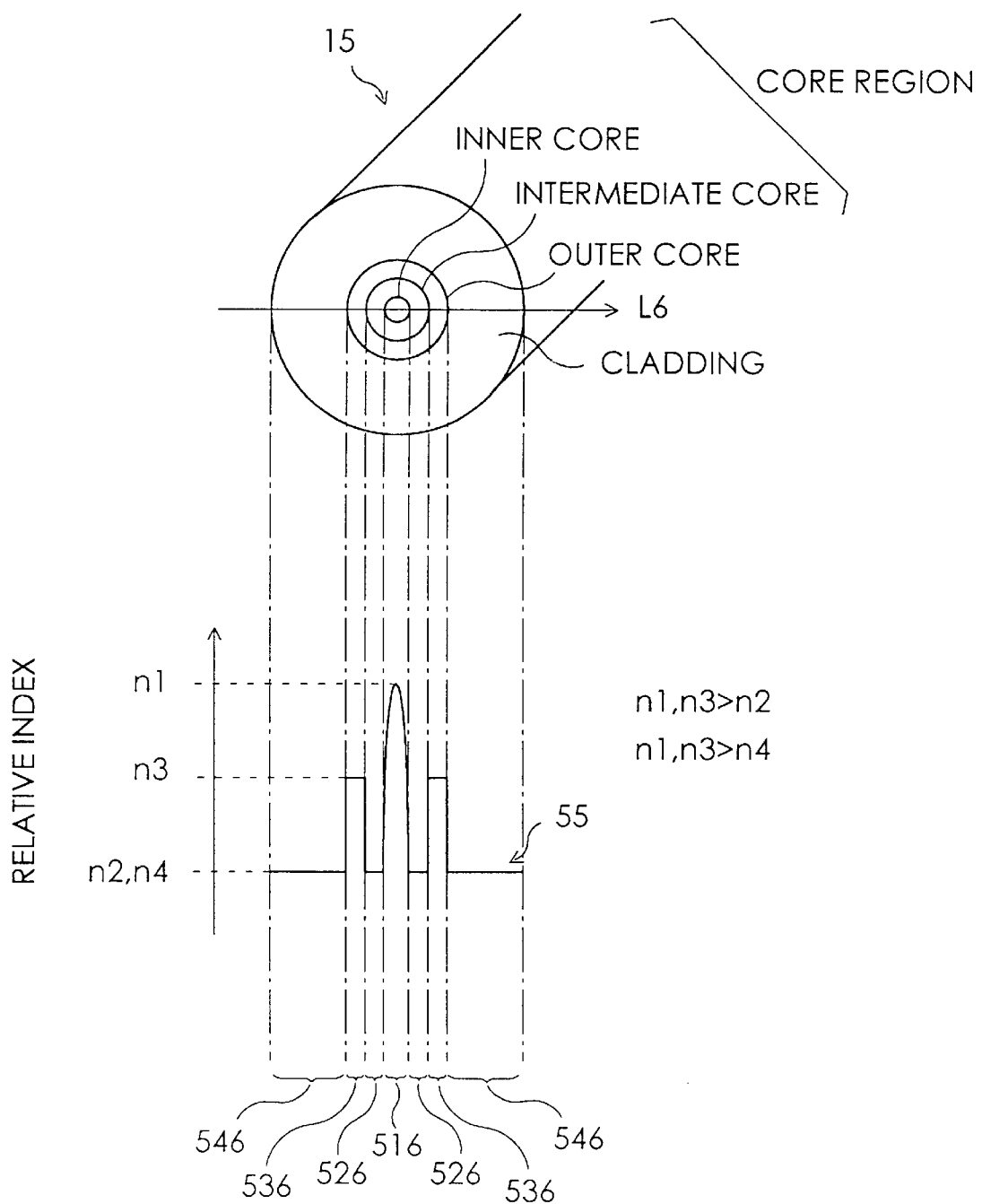
FIG. 12 is a view showing the cross-sectional structure of a dispersion-shifted fiber (having a segment core structure) according to the present invention and its refractive index profile.

Also, the present invention yields similar effects in the case of a dispersion-shifted fiber 15 (matched type fiber), as shown in FIG. 12, comprising a segment core structure in which its core region has a three-layer structure of an inner core (first core), an intermediate core (second core), and an outer core (third core), while the refractive index of the intermediate core is lower than that of the inner core and that of the outer core; as well as in the case of a dispersion-shifted fiber (matched type fiber) comprising a dual ring structure. Here, the axis of abscissa of a refractive index profile 55 shown in FIG. 12 corresponds to positions on line L6 in the cross section of this dispersion-shifted fiber 15 (plane perpendicular to the advancing direction of signal light propagated therethrough). Further, in this refractive index profile 55, regions 516, 526, 536, and 546 respectively correspond to the relative refractive index differences on the line L6 of parts in the inner core, intermediate core, outer core, and cladding.

Figure 13:
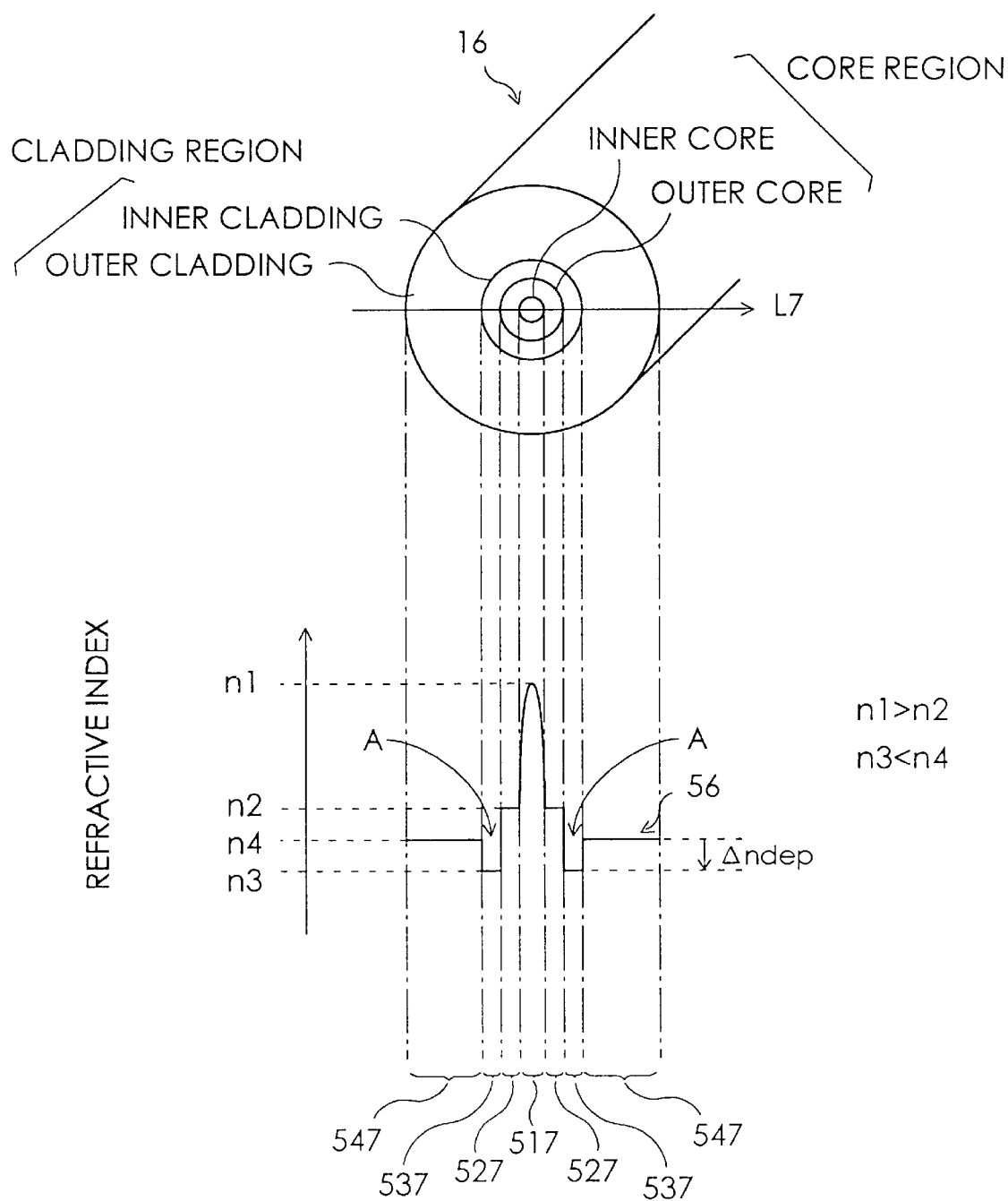
FIG. 13 is a view showing the cross-sectional structure of a dispersion-shifted fiber (depressed type fiber) according to the present invention and its refractive index profile.

Further, the present invention yields similar effects in the case of a dispersion-shifted fiber (depressed type fiber) in which, as shown in FIG. 13, the cladding region has a double structure of an inner cladding (first cladding) and an outer cladding (second cladding), while the refractive index of the inner cladding is lower than that of the outer cladding. Here, the axis of abscissa of a refractive index profile 56 shown in FIG. 13 corresponds to positions on line L7 in the cross section of this dispersion-shifted fiber 16 (plane perpendicular to the advancing direction of signal light propagated therethrough). Further, in this refractive index profile 56, regions 517, 527, 537, and 547 respectively correspond to the relative refractive index differences on the line L7 of parts in the inner core, outer core, inner cladding, and outer cladding.

FIGS. 14A to 14C are views showing specific depressed cladding type profiles. Specifically, FIG. 14A shows a depressed cladding type profile having a dual shape core structure, FIG. 14B shows a depressed cladding type profile having a segment core structure, and FIG. 14C shows a depressed cladding type profile having a dual ring core structure. As can be seen from these refractive index profiles, a depression A is formed at a portion corresponding to the cladding region. The depth of this depression A is defined by the relative refractive index $\Delta n_{dep}$ of the inner cladding with respect to the outer cladding.

When a depressed cladding type profile is adopted as the refractive index profile of the dispersion-shifted fiber according to the present invention, its profile volume must be adjusted beforehand in view of the fact that the cutoff wavelength of the resulting dispersion-shifted fiber at a 2 m length thereof becomes shorter than that of a dispersion-shifted fiber having a matched type profile at a 2 m length thereof on the basis of the result of measurement explained in the following.

The inventors have measured the amount of deviation of the cutoff wavelength of a dispersion-shifted fiber having a depressed cladding type profile and that having a matched type profile from each other in a dual shape core structure.

Figure 15:
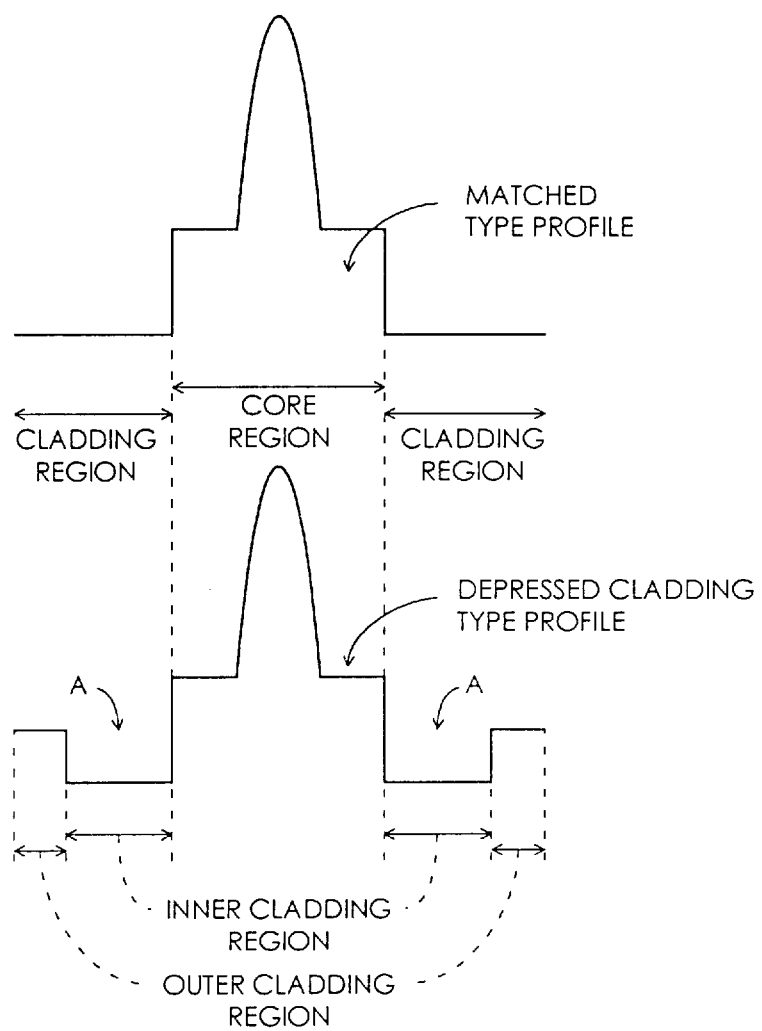
FIG. 15 is a view showing the relationship between the matched type profile and depressed cladding type profile used for measuring the cutoff wavelength.

In particular, as shown in FIG. 15, a dispersion-shifted fiber having a matched type profile which becomes a reference, and a plurality of depressed type fibers having different values of relative refractive index difference $\Delta n_{dep}$ of the inner cladding with respect to the outer cladding are prepared. Also, the refractive index profiles of thus prepared depressed type fiber differ from each other only in the depth ($\Delta n_{dep}$) of the depression A corresponding to the cladding region.

Figure 16:
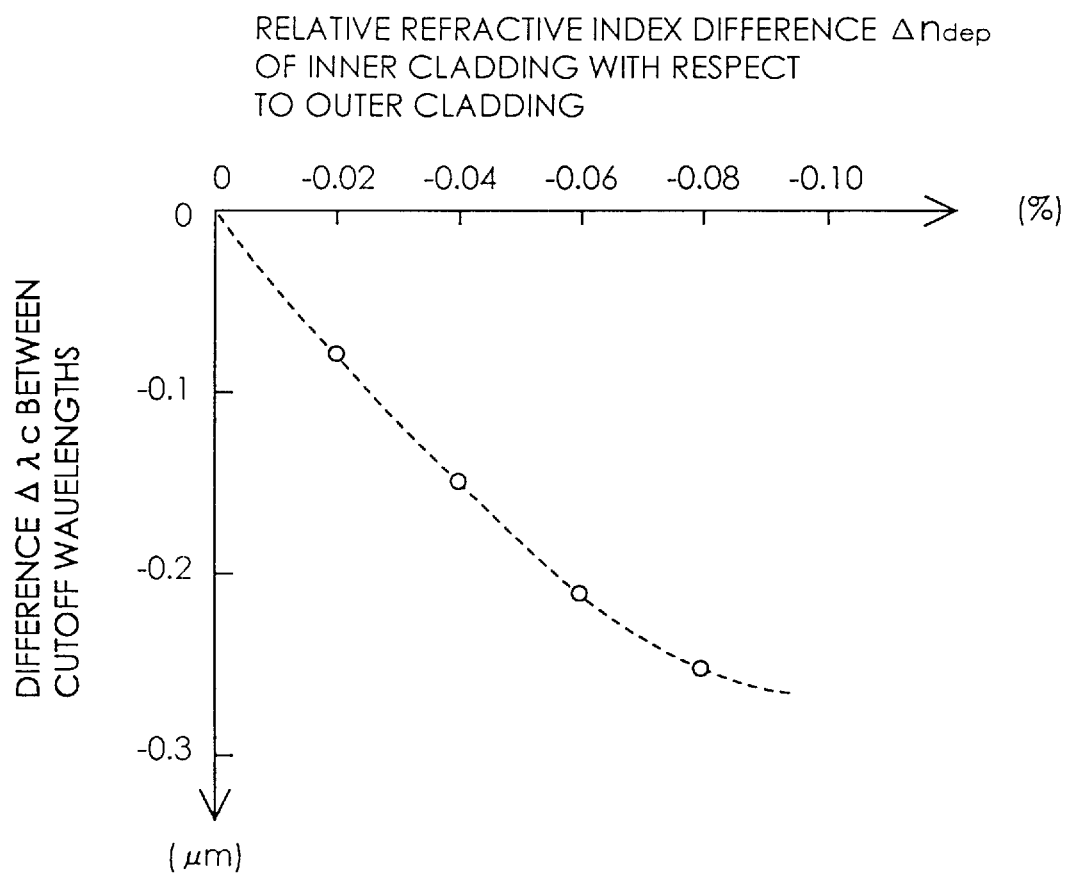
FIG. 16 is a graph showing the relationship between the amount of deviation in cutoff wavelength at a 2 m length between the dispersion-shifted fiber having a depressed cladding type profile and that having a matched type profile and the relative refractive index difference $\Delta n_{dep}$ of the inner cladding with respect to the outer cladding in the depressed cladding type profile.

FIG. 16 is a graph showing the relationship between the relative refractive index $\Delta n_{dep}$ of the inner cladding with respect to the outer cladding and the amount of deviation from the cutout wavelength of the reference matched type fiber (at a length of 2 m) in each of thus prepared depressed type fibers. As can be seen from this graph, the cutoff wavelength at a 2 m length of the depressed type fiber is shorter than that of the matched type fiber. Accordingly, when a depressed cladding type profile is adopted as the refractive index profile of the dispersion-shifted fiber according the present invention, its profile volume must be adjusted beforehand in view of this amount of deviation in cutoff wavelength at a length of 2 m.

For example, in an actually measured dual shape core structure, it can be seen from FIG. 16 that the cutoff wavelength at a 2 m length of a depressed type fiber having a depression with $\Delta n_{dep}=-0.02\%$ in its refractive index profile becomes shorter by 0.08 μm than the matched type fiber having no depression. Accordingly, the range of profile volume where the cutoff wavelength at a length of 2 m becomes at least 1.6 μm differs between the matched type fiber and the depressed type fiber as follows.

Matched type fiber:

$$\int_0^a \Delta n(r) \cdot rdr \geq 8.4 (\% \cdot \mu m^2)$$

Depressed type fiber:

$$\int_0^a \Delta n(r) \cdot rdr \geq 9.4 (\% \cdot \mu m^2)$$

Here, since the amount of deviation of the cutoff wavelength of the depressed type fiber from that of the matched type fiber is seen from FIG. 16, the range of profile volume of the depressed type fiber can be set in view of this amount of deviation according to the relationship of FIG. 3. Namely, in order to set the cutoff wavelength at a 2 m length of the depressed type fiber at 1.6 μm in the case of this example, since it is seen from FIG. 16 that its cutoff wavelength becomes shorter by 0.08 μm than that of the matched type fiber, the profile volume is adjusted to 9.4 (%.μm²) such that the cutoff wavelength at a length of 2 m becomes 1.68 μm in view of FIG. 3.

As explained in the foregoing, in the dispersion-shifted fiber according to the present invention, since the cutoff wavelength at a reference length of 2 m is set to at least 1.6 μm which is longer than that in the conventional dispersion-shifted fiber, the MFD can be enlarged without increasing bending loss, whereby the distortion in signal waveform and the like which may occur due to a nonlinear effect can be reduced so as to more effectively realize optical transmission.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 022742/1996 filed on Feb. 8, 1996 is hereby incorporated by reference.

What is claimed is:

1. A dispersion-shifted fiber having:
   a zero-dispersion wavelength within the range within the range of 1.4 μm to 1.7 μm; and
   a cutoff wavelength of 1.6 μm or more at a 2 m length of said dispersion-shifted fiber,
   wherein said dispersion-shifted fiber comprises a core region and a cladding region disposed around an outer periphery of said core region, said core region including:
   a first core having a predetermined refractive index; and
   a second core disposed around an outer periphery of said first core, said second core having a lower refractive index than said first core, and
   wherein, when said core region has an outer diameter of 2a, said dispersion-shifted fiber satisfies the following requirement:

$$\int_0^a \Delta n(r) \cdot rdr \geq 8.4 (\% \cdot \mu m^2)$$

$$0.6(\%) \leq \Delta n_{max} \leq 1.4(\%)$$

wherein
   r is a distance from a center of said dispersion-shifted fiber in a radial direction thereof;
   $\Delta n(r)$ is a relative refractive index difference with respect to said cladding region at the position apart from the center to said dispersion-shifted fiber at the distance r; and
   $\Delta n_{max}$ is a maximum relative refractive index difference in said core region with respect to said cladding region.

2. A dispersion-shifted fiber according to claim 1, wherein said dispersion-shifted fiber has a mode field diameter of 9.0 μm or more.

3. A dispersion-shifted fiber having:
   a zero-dispersion wavelength within the range of 1.4 μm to 1.7 m; and
   a cutoff wavelength of 1.6 μm or more at a 2 m length of said dispersion-shifted fiber
   wherein said dispersion-shifted fiber comprises a core region and a cladding region disposed around an outer periphery of said core region, said core region including:
   a first core having a predetermined refractive index; and
   a second core disposed around an outer periphery of said first core, said second core having a lower refractive index than said first core, and
   wherein said cladding region includes:
   a first cladding disposed around an outer periphery of said second core, said first cladding having a lower refractive index than said second core; and
   a second cladding disposed around an outer periphery of said first cladding, said second cladding having a higher refractive index than said first cladding.

4. A dispersion-shifted fiber according to claim 3, wherein, said dispersion-shifted fiber has a profile volume defined as follows:

$$\int_0^a \Delta n(r) \cdot rdr$$

wherein
   a is radius of said core region;
   r is distance from center of said dispersion-shifted fiber in radial direction thereof; and
   $\Delta n(r)$ is relative refractive index difference with respect to said first cladding at the position apart form the center of said dispersion-shifted fiber at the distance r;
   said profile volume being adjusted beforehand in view of an amount of deviation of said cutoff wavelength which depends on relative refractive index difference $\Delta n_{dep}$ of said first cladding with respect to said second cladding.

5. A dispersion-shifted fiber according to claim 3, wherein said dispersion-shifted fiber has a mode field diameter of 9.0 µm or more.

6. A dispersion-shifted fiber having:
  a zero-dispersion wavelength within the range of 1.4 µm to 1.7 µm; and
  a cutoff wavelength of 1.6 µm or more at a 2 m length of said dispersion-shifted fiber,
  wherein said dispersion-shifted fiber comprises a core region and a cladding region disposed around an outer periphery of said core region, said core region including:
  a first core having a predetermined refractive index;
  a second core disposed around an outer periphery of said first core, said second core having a lower refractive index than said first core; and
  a third core disposed around an outer periphery of said second core, said third core having a higher refractive index than said second core, and
  wherein, when said core region has an outer diameter of 2a, said dispersion shifted fiber satisfies the following requirement:

$$\int_0^a \Delta n(r) \cdot rdr \geq 6.4(\% \cdot \mu m^2)$$

$$0.6(\%) \leq \Delta n_{max} \leq 1.4(\%)$$

wherein
  r is a distance from a center of said dispersion-shifted fiber in a radial direction thereof;
  $\Delta n(r)$ is a relative refractive index difference with respect to said cladding region at the position apart from the center of said dispersion-shifted fiber at the distance r; and
  $\Delta n_{max}$ is a maximum relative refractive index difference in said core region with respect to said cladding region.

7. A dispersion-shifted fiber according to claim 6, wherein said dispersion-shifted fiber has a mode field diameter of 9.0 µm or more.

8. A dispersion-shifted fiber having:
  a zero-dispersion wavelength within the range of 1.4 µm to 1.7 µm; and
  a cutoff wavelength of 1.6 µm or more at a 2 length of said dispersion shifted fiber,
  wherein said dispersion-shifted fiber comprises a core region and a cladding region disposed around an outer periphery of said core region, said core region including;
  a first core having a predetermined refractive index;
  a second core disposed around an outer periphery of said first core, said second core having a lower refractive index than said first core; and
  a third core disposed around an outer periphery of said second core, said third core having a higher refractive index than said second core, and
  wherein said cladding region includes:
  a first cladding disposed around an outer periphery of said third core, said first cladding having a lower refractive index than said third core; and
  a second cladding disposes around an outer periphery of said first cladding, said second cladding having a higher refractive index than said first cladding.

9. A dispersion-shifted fiber according to claim 8, wherein, said dispersion-shifted fiber has a profile volume defined as follows:

$$\int_0^a \Delta n(r) \cdot rdr$$

wherein
  a is radius of said core region;
  r is distance from center of said dispersion-shifted fiber in radial direction thereof; and
  $\Delta n(r)$ is relative refractive index difference with respect to said first cladding at the position apart from the center of said dispersion-shifted fiber at the distance r;
  said profile volume being adjusted beforehand in view of an amount of deviation of said cutoff wavelength which depends on relative refractive index difference $\Delta n_{dep}$ of said first cladding with respect to said second cladding.

10. A dispersion-shifted fiber according to claim 8, wherein said dispersion-shifted fiber has a mode field diameter of 9.0 µm or more.

11. A dispersion-shifted fiber having:
  a zero-dispersion wavelength within the range of 1.4 µm to 1.7 µm; and
  a cutoff wavelength of 1.6 µm or more at a 2 length of said dispersion shifted fiber,
  wherein said dispersion-shifted fiber comprises a core region and a cladding region disposed around an outer periphery of said core region, said core region including:
  a first core having a predetermined refractive index;
  a second core disposes around an outer periphery of said first core, said second core having a lower refractive index than said first core;
  a third core disposed around an outer periphery of said second core, said third core having a lower refractive index than said second core; and
  a fourth core disposed around an outer periphery of said third core, said fourth core having a higher refractive index than said third core, and
  wherein, when said core region has an outer diameter of 2a, said dispersion-shifted fiber satisfies the following requirement:

$$\int_0^a \Delta n(r) \cdot rdr \geq 5.8(\% \cdot \mu m^2)$$

$$0.7(\%) \leq \Delta n_{max} \leq 2.0(\%)$$

wherein
  r is a distance from a center of said dispersion-shifted fiber in a radial direction thereof;
  $\Delta n(r)$ is a relative refractive index difference with respect to said cladding region at the position apart from the center of said dispersion-shifted fiber at the distance r; and
  $\Delta n_{max}$ is a maximum relative refractive index difference in said core region with respect to said cladding region.

12. A dispersion-shifted fiber according to claim 11, wherein said dispersion-shifted fiber has a mode field diameter of 9.0 µm or more.

13. A dispersion-shifted fiber having:
  a zero-dispersion wavelength within the range of 1.4 µm to 1.7 µm; and
  a cutoff wavelength of 1.6 µm or more at a 2 m length of said dispersion-shifted fiber, wherein said dispersion-shifted fiber comprises a core region and a cladding region disposed around an outer periphery of said core region, said core region including:

a first core having a predetermined refractive index;

a second core disposed around an outer periphery of said first core, said second core having a lower refractive index than said first core;

a third core disposed around an outer periphery of said second core, said third core having a lower refractive index than said second core; and a fourth core disposed around an outer periphery of said third core, said fourth core having a higher refractive index than said third core, and wherein said cladding region includes:

a first cladding disposed around an outer periphery of said fourth core, said first cladding having a lower refractive index than said fourth core; and a second cladding disposed around an outer periphery of said first cladding, said second cladding having a higher refractive index than said first cladding.

14. A dispersion-shifted fiber according to claim 13, wherein, said dispersion-shifted fiber has a profile volume defined as follows:
wherein $$\int_0^a \Delta n(r) \cdot r dr$$

a is radius of said core region;

r is distance from center of said dispersion-shifted fiber in radial direction thereof; and $\Delta n(r)$ is relative refractive index difference with respect to said first cladding at the position apart from the center of said dispersion-shifted fiber at the distance r;

said profile volume being adjusted beforehand in view of an amount of deviation of said cutoff wavelength which depends on relative refractive index difference $\Delta n_{dep}$ of said first cladding with respect to said second cladding.

15. A dispersion-shifted fiber according to claim 13, wherein said dispersion-shifted fiber has a mode field diameter of 9.0 μm or more.

16. A dispersion-shifted fiber having:

a zero-dispersion wavelength within the range of 1.4 μm to 1.7 μm; and a cutoff wavelength of 1.64 μm or more at a 2 m length of said dispersion-shifted fiber.

17. A dispersion-shifted fiber according to claim 16, wherein said dispersion-shifted fiber has a mode field diameter of 9.4 μm or more.

18. A dispersion-shifted fiber according to claim 16, wherein said dispersion-shifted fiber comprises a core region and a cladding region disposed around an outer periphery of said core region, said core region including:

a first core having a predetermined refractive index; and a second core disposed around an outer periphery of said first core, said second core having a lower refractive index than said first core.

19. A dispersion-shifted fiber according to claim 16, wherein said dispersion-shifted fiber comprises a core region and a cladding region disposes around an outer periphery of said core region, said core region including:

a first core having a predetermined refractive index;

a second core disposed around an outer periphery of said first core, said second core having a lower refractive index than said first core; and a third core disposed around an outer periphery of said second core, said third core having a higher refractive index than said second core.

20. A dispersion-shifted fiber according to claim 16, wherein said dispersion-shifted fiber comprises a core region and a cladding region disposed around an outer periphery of said core region, said core region including:

a first core having a predetermined refractive index;

a second core disposed around an outer periphery of said first core, said second core having a lower refractive index than said first core;

a third core disposed around an outer periphery of said second core, said third core having a lower refractive index than said second core; and a fourth core disposes around an outer periphery of said third core, said fourth core having a higher refractive index than said third core.

21. A dispersion-shifted fiber having:

a zero-dispersion wavelength within the range of 1.4 μm to 1.7 μm; and a cutoff wavelength of 1.7 μm or more at 2 m length of said dispersion-shifted fiber.

22. A dispersion-shifted fiber according to claim 21 wherein said dispersion-shifted fiber has a mode field diameter of 10 μm or more.

23. A dispersion-shifted fiber according to claim 21, wherein said dispersion-shifted fiber comprises a core region and a cladding region disposed around an outer periphery of said core region, said core region including:

a first core having a predetermined refractive index; and a second core disposed around an outer periphery of said first core, said second core having a lower refractive index than said first core.

24. A dispersion-shifted fiber according to claim 21, wherein said dispersion-shifted fiber comprises a core region and a cladding region disposed around an outer periphery of said core region, said core region including:

a first core having a predetermined refractive index;

a second core disposed around an outer periphery of said first core, said second core having a lower refractive index than said first core; and a third core disposed around an outer periphery of said second core, said third core having a higher refractive index than said second core.

25. A dispersion-shifted fiber according to claim 21, wherein said dispersion-shifted fiber comprises a core region and a cladding region disposed around an outer periphery of said core region, said core region including:

a first core having a predetermined refractive index;

a second core disposed around an outer periphery of said first core, said second core having a higher refractive index than said first core;

a third core disposed around an outer periphery of said second core, said third core having a lower refractive index than said second core; and a fourth core disposed around an outer periphery of said third core, said fourth core having a higher refractive index than said third core.

* * * * *